United States Patent
Merk et al.

(10) Patent No.: US 11,825,853 B2
(45) Date of Patent: Nov. 28, 2023

(54) SUSPENSION UNIT WITH INCLINED GUIDE RAIL

(71) Applicant: ALBERT HANDTMANN MASCHINENFABRIK GMBH & CO. KG, Biberach (DE)

(72) Inventors: Jochen Merk, Ochsenhausen (DE); Manfred Baechtle, Schemmerhofen (DE); Gerhard Schliesser, Wain (DE); Robert Winghart, Oberstadion (DE); Kurt Strohm, Attenweiler (DE); Florian Osswald, Ulm (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 326 days.

(21) Appl. No.: 17/390,810

(22) Filed: Jul. 30, 2021

(65) Prior Publication Data

US 2021/0352921 A1   Nov. 18, 2021

Related U.S. Application Data

(62) Division of application No. 16/025,725, filed on Jul. 2, 2018, now Pat. No. 11,109,597.

(30) Foreign Application Priority Data

Jul. 3, 2017 (EP) .................................... 17179345

(51) Int. Cl.
A22C 15/00  (2006.01)
A22C 11/00  (2006.01)

(52) U.S. Cl.
CPC .......... *A22C 15/002* (2013.01); *A22C 11/008* (2013.01); *A22C 15/00* (2013.01); *A22C 15/001* (2013.01)

(58) Field of Classification Search
CPC .... A22C 15/002; A22C 15/001; A22C 11/008
(Continued)

(56) References Cited

U.S. PATENT DOCUMENTS 7,160,184 B1 * 1/2007 Lebsack ............... A22C 15/002
                                                           452/177
8,342,318 B2   1/2013 Knodel
(Continued)

FOREIGN PATENT DOCUMENTS

CN         1328420 A     12/2001
CN       103831803 A      6/2014
(Continued)

OTHER PUBLICATIONS

Russian Federal Service for Intellectual Property, Office Action Issued in Application No. 2018123590/10(037413), dated May 22, 2019, Saint-Petersburg, Russia, 7 pages.

Primary Examiner — Richard T Price, Jr.
(74) Attorney, Agent, or Firm — McCoy Russell LLP

(57) ABSTRACT

The present disclosure relates to a suspension unit and a method for taking up and transporting sausage loops with a guide rail and hooks circulating around the guide rail, where the guide rail has an elongate front side and an oppositely disposed rear side. The guide rail is inclined relative to a horizontal plane such that the front side is at a higher level than the rear side.

19 Claims, 14 Drawing Sheets

(58) Field of Classification Search
USPC .......................................................... 452/51
See application file for complete search history.

(56) References Cited

U.S. PATENT DOCUMENTS

| | | |
|---|---|---|
| 2002/0093848 A1 | 7/2002 | Thewes et al. |
| 2004/0116060 A1 | 6/2004 | Cate et al. |
| 2007/0093192 A1 | 4/2007 | Lebsack et al. |
| 2007/0254571 A1 | 11/2007 | Gladh |
| 2011/0130082 A1 | 6/2011 | Knodel |
| 2012/0231714 A1 | 9/2012 | Krompholz et al. |
| 2016/0066588 A1 | 3/2016 | Nakamura et al. |
| 2019/0000093 A1 | 1/2019 | Merk et al. |
| 2021/0352921 A1* | 11/2021 | Merk ..................... A22C 15/00 |

FOREIGN PATENT DOCUMENTS

| | | |
|---|---|---|
| CN | 204500797 U | 7/2015 |
| DE | 202009015265 U1 | 3/2011 |
| DE | 102011005201 A1 | 9/2012 |
| EP | 1172035 A1 | 1/2002 |
| SU | 411823 A1 | 1/1974 |

\* cited by examiner

SUSPENSION UNIT WITH INCLINED GUIDE RAIL

CROSS-REFERENCE TO RELATED APPLICATIONS

The present application is a divisional of U.S. Non-Provisional patent application Ser. No. 16/025,725, entitled "SUSPENSION UNIT WITH INCLINED GUIDE RAIL," filed on Jul. 2, 2018. U.S. Non-Provisional patent application Ser. No. 16/025,725 claims priority to European Patent Application No. 17179345.8 entitled "SUSPENSION UNIT WITH INCLINED GUIDE RAIL," filed on Jul. 3, 2017. The entire contents of the above-listed applications are hereby incorporated by reference for all purposes.

TECHNICAL FIELD

The present disclosure relates to a suspension unit and a method for taking up and transporting sausage loops.

BACKGROUND AND SUMMARY

In the production of sausages or sausage products by filling and portioning systems, sausage casings, e.g. natural, alginate, artificial or collagen casings, are filled with pasty mass using of a stuffing machine, such as a vacuum stuffing machine. By linking the stuffed casing, a sausage chain of connected individual sausages or portions is created in the linking line. When the sausage chain is transferred to a suspension unit, hooks engage at predetermined separation points so that several sausage loops are formed from the sausage chain on the suspension unit (see, for example, FIG. 18A). Such a loop consists of several sausages (3-loop, 4-loop, in FIG. 18A e.g. 6-loop). But it is also possible to suspend the sausages in pairs (FIG. 18B) or suspend one or more individual sausages, for example, on a loop on a hook (FIG. 18C).

Several hooks with respective sausages can be combined to so-called sausage groups. When processing product on the suspension unit, the operators must e.g. separate the group transitions (from the end of one smoke stick 16 to the beginning of the next smoke stick 16) and e.g. close open portion ends (regardless of the type of casing). For manual product removal from the suspension unit, the operators must insert thread a smoke stick 16 into the loops of a group, as shown for example in FIG. 17, and then remove smoke stick 16 hung with sausage loops from the hooks for further processing.

Since the sausages in common suspension units are delivered by a stuffing machine or a linking line, the hooks of the suspension device are at a relatively low height level. Conventional stuffing machines and linking lines have a filling height, for example, of about 1000 mm to 1250 mm. This entails that a tall operator must bend down to the sausages for product processing, which is unacceptable under ergonomic considerations.

In conventional art, there are already approaches to raise the level. For example, it is proposed in EP 1 172 035 to raise the sausages above a conveyor belt with a level increase and only then to transfer them to the suspension unit. A respective solution is complex. Individual adjustment of the working height is not possible.

Based on this, the object of the present disclosure is to provide an improved suspension unit and a method which make it possible that the working height at the suspension unit for product processing is optimal for all operator heights.

The suspension unit according to the present disclosure for taking up and transporting sausage loops comprises a guide rail with several circulating hooks. The guide rail comprises an elongate front side and an oppositely disposed rear side. The working areas are located at these sides. According to the present disclosure, the closed guide rail is now not in a horizontal plane like in conventional art, but is inclined relative to a horizontal plane such that the front side is at a higher level than the rear side.

By simply inclining the guide rail or the circulation track, for example, at the raised front side, this has the advantage that product handling, such as severing sausage chains or closing open sausage ends, can be performed without the operator needing to stoop down. On the opposite side, which is at a lower level, a sausage group can then easily be removed with the aid of a smoke stick. A low working height is acceptable for this work step. The ergonomics improve significantly for the operator. A straight i.e. horizontally aligned conveyor belt can therefore be used in the linking line for delivering the sausages, which, on the one hand, increases performance and reduces costs. This means that raising the working level does not take place in the region of the linking line, but is realized within the suspension unit. The present disclosure also makes it possible that the length of the working area is not restricted at the rear side and only insignificantly at the front side. This results in a very high degree of utilization of the length of the suspension unit. The operator therefore has a large region of the length available as a working area, since the height difference for the hook motion is implemented from the front side to the rear side, i.e. transverse to the filling direction.

A drive element, such as a drive belt, can be arranged on the guide rail and be inclined together with the guide rail. A revolving drive element, such as a toothed belt, can therefore be used in a simple and inexpensive manner, for example, with a hook spacing with a predetermined intervals (e.g. 5 mm intervals for optimum smoke stick utilization). The drive element then also moves in an inclined plane. Such a solution is simple and inexpensive.

The guide rail can either be fixedly mounted in an inclined position. But it is also possible that the guide rail is pivotable about an axis of rotation D and by an angle α, i.e. is steplessly adjustable. The guide rail may be rotatably mounted on a chassis. Such an arrangement is simple and inexpensive to implement, and requires only a rotating and locking mechanism as compared to the conventional suspension unit. The axis of rotation is aligned may be substantially parallel (where "substantially" means with a tolerance of <=+−10°) to the longitudinal axis of the suspension unit, i.e., substantially parallel to the longitudinal axis of the chassis. This means that the axis of rotation may run substantially parallel to the direction of transport TR, which in turn corresponds to the filling direction of the stuffing machine and the direction of transport of the conveyor belts of the linking line.

The height level at the front side of the guide rail can then be adjusted, i.e. locked in place steplessly or at discrete intervals. This has an advantage that, depending on the pivot angle α, the hooks are in the filling direction i.e. at the front side of the suspension unit, disposed at a higher working level and opposite to the filling direction, i.e. at the rear said at a lower working level or at substantially the same working level. By varying the pivot angle, the height at the front side can be adjusted exactly to the height of the operator in an ergonomically optimized manner.

Starting out from a horizontal orientation, the pivot angle $\alpha$ is, for example, in a range between 0° and 85° or from 5°-30°.

The guide rail at a first end comprises a deflection region in which the hooks are deflected by 95°-180°, 160°-180° or 180°, where the hooks in the deflection region take up the separation points of the sausage chains. This deflection angle range may be advantageous because the sausage chains can then be removed precisely and the sausage loops can develop completely within the angle 95°-180°.

The distance $b_1$ of a guide rail section at the front side immediately upstream of the deflection region from a guide rail section at the rear side immediately downstream of the deflection region is smaller than the distance $b_2$ in a region that is in the direction of transport TR downstream, wherein distance $b_1$ may be in a range from 50 mm to 100 mm and distance $b_2$ in the downstream region increases up to 300 mm to 600 mm.

The guide rail and/or at least respective guide rail sections (within the meaning of partial regions of the guide rail at the front side and the rear side) at the front side and the rear side taper at an acute angle between 5°-85° or 15° and 45° toward the deflection region such that distance $b_1$ widens to distance $b_2$.

A section extending obliquely relative to the direction of transport is there provided e.g. at the front side downstream of the deflection region such that distance $b_1$ widens to distance $b_2$. For example, a concavely curved section can also be arranged downstream of the deflection region. With a curved section, the hooks can be guided when the hooks have been deflected by 180°. The curved section can directly adjoin the deflection region, but it is also possible that a section at the front side of the guide rails downstream of the deflection region first extends in parallel and is then followed by a concave section.

Retaining elements, such as retaining strips (e.g. L-shaped), which hold the revolving drive element on the guide rail, may be provided on the concavely curved section. Otherwise, the drive element would protrude like a bowstring from the beginning to the end of the concavely curved section.

The axis of rotation may be located in a plane that is spanned by a vector which extends substantially parallel to the direction of transport TR and a vector which is perpendicular to the upper side of the closed guide rail (i.e. a virtual surface defined by the upper side of the guide rails). This vector is there arranged closer to the rear side of the guide rail than to the front side of the guide rail. Due to the fact that the axis of rotation is closer to the rear side (e.g. also coincides therewith or is located directly therebeneath), the advantage arises that the height of the guide rail can be adjusted arbitrarily at the front side, whereas the height at the rear side can be kept substantially constant or changed only slightly. The guide rail on the rear side, where, for example, a sausage group is removed with a smoke stick, is not located too low, so that the sausage groups can be easily removed. The vector may extend perpendicularly through an upper side of the guide rail in the deflection region. With such an axis of rotation, the transfer position of the hook changes only insignificantly.

The distance of the axis of rotation D from a virtual surface or plane which is spanned by the lower edges of the guide rail is in a range from 10 mm to 150 mm or 30 mm to 70 mm.

The distance K of the hook tip of a substantially L-shaped hook from the axis of rotation may be in a range <=50 mm. If the axis of rotation is arranged as close as possible to the hook tip in a transfer position in the deflection region, then the hook tip may be positioned substantially the same, regardless of the height adjustment of the guide rail, i.e. regardless of the pivot motion.

According to an embodiment, the device comprises an apparatus which additionally changes the position of the hooks, i.e. in addition to the pivot mechanism of the guide rail. For example, the apparatus can additionally pivot the hooks by an angle of 5° to 30°. This means, for example, with a position of the guide rail crossed by an angle $\alpha$, taking the hooks to a position which substantially corresponds to a hook position at $\alpha=0\pm10°$. A sufficient spread of sausage loops in the hooks can thus be provided, which is advantageous for the removal with a smoke stick.

According to an embodiment, the hooks are rotatably mounted on the guide rail. This means that, for example, the one-piece hooks are pivotable upwardly on the lower rear side in order to assume a position suitable for removing the sausage loops. However, the hook position can also be changed, for example, at the lower rear side such that the hooks themselves comprise, for example, a joint and the hook sections are moved about an axis of rotation such that the hook position changes.

It is possible for the apparatus to comprise an additional guide which, when the guide track is pivoted, can press against a guide region of the hooks (e.g. at the upper end region of the hooks) such that the hooks on the rear side of the guide rail can be pivoted upwardly. It would additionally or alternatively also be possible to pivot the hooks, which are inclined by the pivot motion, by pivoting them downwardly on the front side to restore a correct orientation of the hook, or to correct their position.

The additional guide may automatically press against the guide region of the hook when the guide track is pivoted, i.e. that the guide rail is mechanically coupled to the additional guide.

Another option for correcting the hook position when the guide track is pivoted is that the guide rail is twisted at least in sections by an angle $\gamma$, such as $\gamma=\alpha\pm10°$. For the stepless adjustment of the height of the front side of the guide rail, for example, a predetermined value based on the maximum pivot angle $\alpha$ and $\alpha=0$ for the twist angle $\gamma$ can be determined and the guide rail can be twisted in the factory, so that the hook position is acceptable for all angles $\alpha$ in the possible pivot range. A guide rail, the front side of which may be aligned vertically or at a predetermined angle relative to the vertical when the guide rail is oriented horizontally, can be taken back to a suitable position by the twist also when the guide path is pivoted at an angle $\alpha$. If, for example, the guide track is twisted at one end region of the front side or the rear side, it is twisted back in one direction at the respective other end region.

In the method according to the present disclosure, sausage loops are received by the hooks in a deflection region of the suspension unit and then moved simultaneously in the direction of transport upwardly and transversely to the direction of transport. This entails the advantage that a large work area can be provided at the front side. The guide rail can either be pivoted fixedly by an angle relative to the horizontal or be pivoted about an axis of rotation D by an angle $\alpha$, where the height level at which the guide rail is disposed at the front side can be adjusted and locked.

In the present disclosure, product processing and/or product removal with a smoke stick can then take place at the raised front side of the guide rail and the removal of the sausage loops with a smoke stick at the rear side.

The present disclosure also relates to a stuffing machine with a linking line and a suspension unit. The suspension unit is there aligned in the direction of transport such that the direction of a transport device corresponds to the linking line or the stuffing machine, i.e. again in the filling direction. The deflection region of the suspension unit can be arranged in the direction of transport directly downstream of the transport device of the linking line.

BRIEF DESCRIPTION OF THE DRAWINGS

The present disclosure shall be explained below in more detail with reference to the following figures:

FIGS. 1-20 are shown approximately to scale.

DETAILED DESCRIPTION

Figure 1:
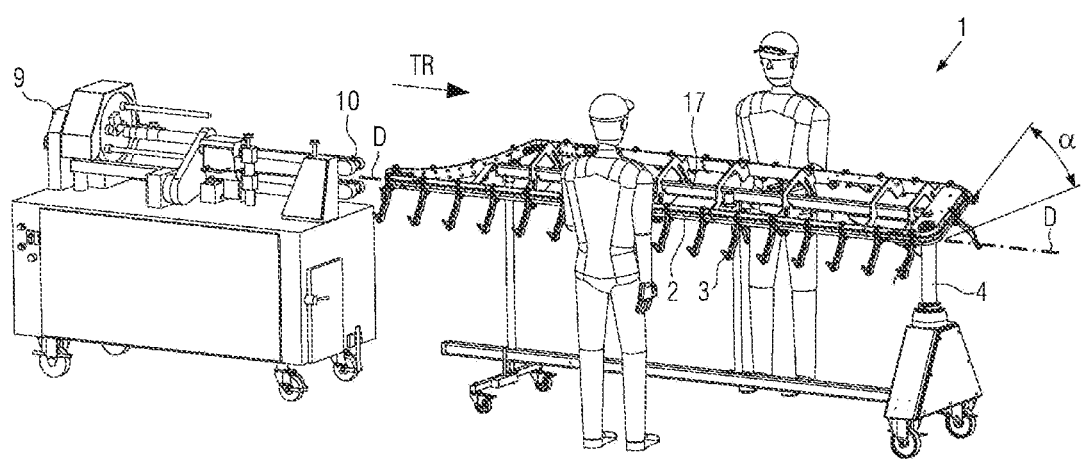
FIG. 1 shows schematically a linking line and a suspension unit according to the present disclosure.

FIG. 1 shows a suspension unit 1 according to one embodiment of the present disclosure which is arranged in the direction of transport TR downstream of a linking line 9. Linking line 9, which is connected to a stuffing machine, such as a vacuum stuffing machine, can divide the sausage casing stuffed with pasty mass, for example link it, so that a sausage chain of individual connected portions is obtained.

Figure 18A:
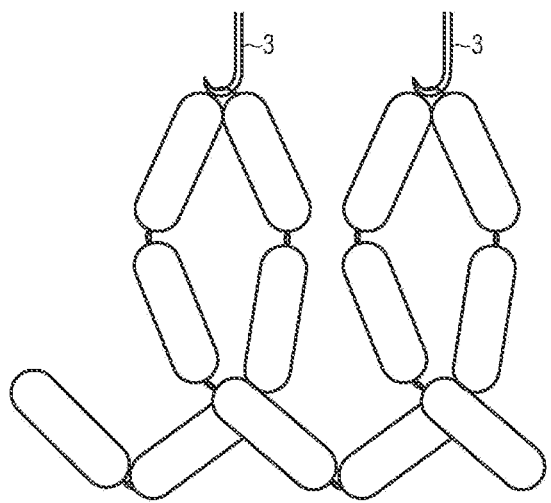
FIG. 18A shows sausage loops on hooks.
Figure 18B:
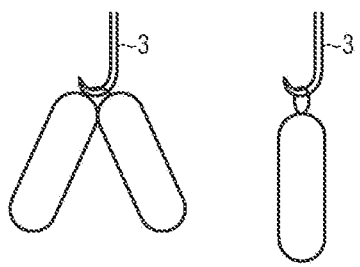
FIG. 18B shows a pair of sausages connected by a loop.
Figure 18C:
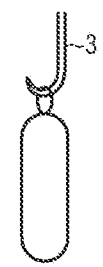
FIG. 18C shows a single sausage shown on a loop on a hook.

When the sausage chain is transferred to suspension unit 1, hooks 3 engage at predetermined separation points so that several sausage loops are formed from the sausage chain on the suspension unit. A loop consists of at least one or more portions (2-loop, 3-loop, 4-loop), as shown, for example, in FIGS. 18A, B, C. Hooks 3 circulate around a circulating guide rail 2.

Figure 19:
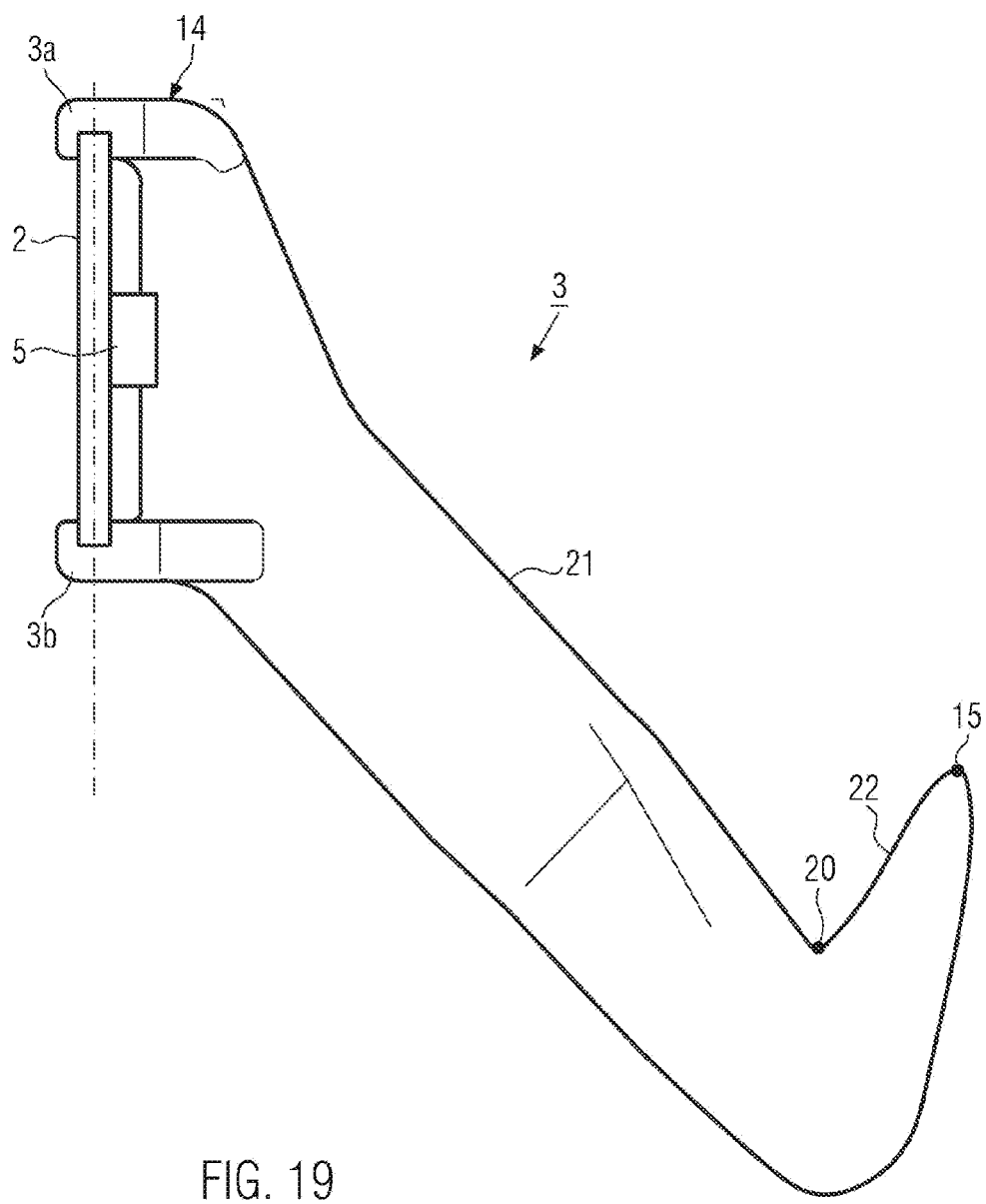
FIG. 19 shows a rough schematic cross section of a hook.

FIG. 19 shows, for example, a corresponding hook 3, which is for example substantially L-shaped, and which comprises a hook tip 15 and a notch 20 between the two arms 21, 22, as well as a guide region 14 at the upper end of arm 21, where, for example, guide region 14 in the embodiment shown in FIG. 19 is guided at the upper and lower regions of guide rail 2. Guide rail 2 there runs e.g. in an upper and lower guide groove. The hooks are driven by a drive element 5, for example a revolving belt, which engages in hook 3. While guide rail 2 is stationary, drive element 5 is driven in rotation by a drive. Drive element 5 can be realized, for example, in the form of a toothed belt, for example, with a hook spacing at an interval of 3 mm to 15 mm, such as an interval of 5 mm for optimal smoke stick utilization.

According to the present disclosure, closed guide rail 2 is inclined relative to a horizontal plane by a pivot angle α. It is possible that the guide rail is fixedly mounted in a respective position on its support 17 to a chassis 4 or a lower part of the suspension unit and the position is not adjustable. Guide rail 2, however, may be pivotable about an axis of rotation D by angle α, such as rotatably mounted on chassis 4, where axis of rotation D extends parallel to the longitudinal axis of the suspension unit, i.e. parallel to the direction of transport TR of the transport device of the linking line or the direction of transport in the working area, respectively, at the front side and the rear side of the suspension unit and also parallel to the filling direction of the stuffing machine. Chassis 4 has a height, for example, of 900 mm to 1200 mm.

Figure 2:
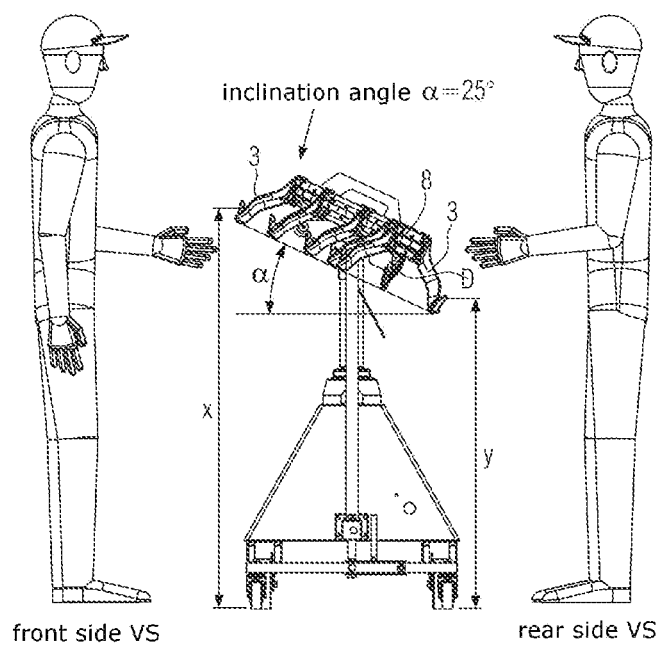
FIG. 2 shows a rough schematic view of the suspension unit shown in FIG. 1 with an inclined guide rail.
Figure 17:
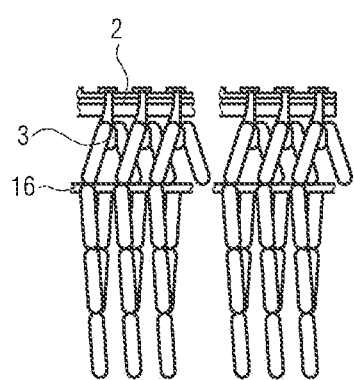
FIG. 17 shows the rear side of a suspension unit in which the sausage loops of a sausage group are taken up with a smoke stick.

As can be seen from FIG. 2, pivoting guide rail 2 results in the working height X at the front side of the suspension unit being at a higher level than the working height Y at the rear side of suspension unit 1. Working height X, i.e. the distance between the floor and notch 20 of the hook can be adjusted, for example, in a range from 900 mm to 1500 mm, such as 1000 mm to 1200 mm, where working height Y at the rear side is then correspondingly lower. Angle α can be in a range from 0° to 85°. The working height can therefore be adjusted ergonomically to the height of the operator by adjusting the pivot angle α. It is then ergonomically advantageous if the operator performs product processing, e.g. separating and closing sausage portions, at front side of the suspension unit or guide rail 2, respectively. The operator then no longer needs to assume a stooped posture. For small operator staff, angle α can be reduced to provide that the operator's hands are not permanently in too high a working position. If product removal by use of a smoke stick, as shown in FIG. 17, takes place on the rear side of the guide rail or the suspension unit, respectively, a low working height Y is not cumbersome and the smoke stick can be easily inserted into the sausage loops for removing a group of sausages.

Adjustment can be effected, for example, in a stepless manner in that the guide rail is pivoted and locked by use of a clamping device. Also adjustment in steps is possible, e.g. by locking the guide rail by way of bolts in predetermined hole spacings.

It is advantageous if the operator further has substantially the entire length on the rear side and 70%-90% of the entire length of the guide rail at the front side of the suspension unit available as a working area for product removal. The reason for this is that the height difference with the hook motion from the front side of the guide rail to the rear side of the guide rail is converted transverse to the direction of transport.

Drive element 5 is inclined together with guide rail 2 and hook 3 arranged thereon.

Figure 3:
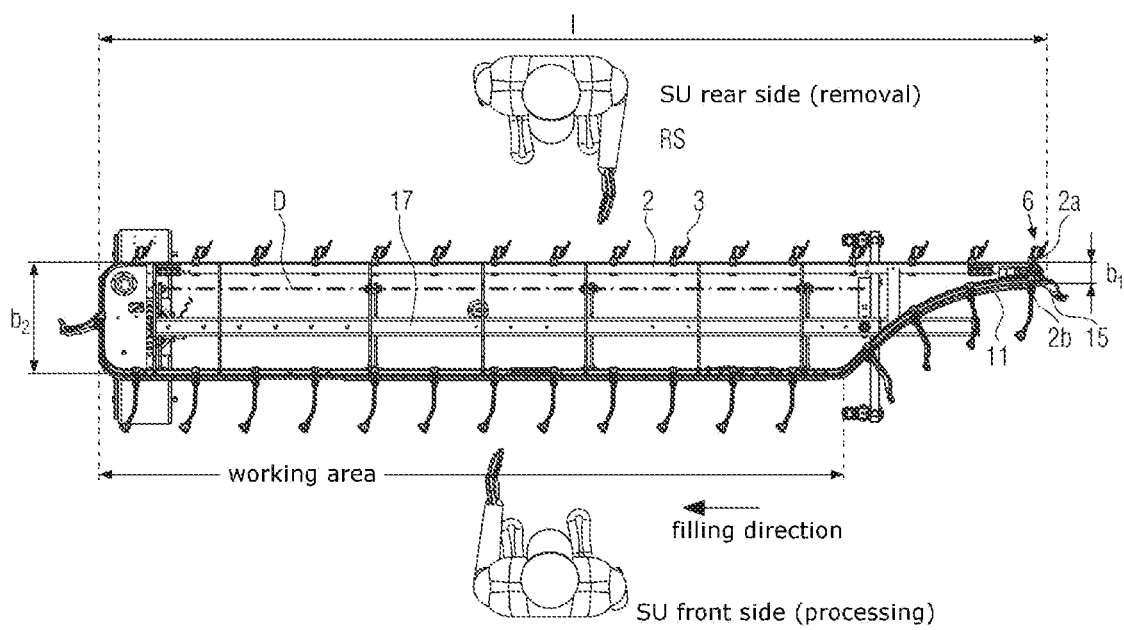
FIG. 3 shows a rough schematic top view of the suspension unit shown in FIGS. 1 and 2.

FIG. 3 shows a top view of the embodiment shown in FIGS. 1 and 2. Closed guide rail 2 comprises a deflection region 6 at its end facing the linking line. The deflection region deflects the hooks by 180° in the embodiment shown in FIG. 3. In deflection region 6, the respective hook 3 receives a sausage loop and transports it further to the front side VS. The distance $b_1$ of a guide rail section 2a at the rear side RS from guide rail section 2b at the front side VS immediately upstream and downstream of the deflection region is smaller than the respective distance $b_2$ of the oppositely disposed sections in a downstream working area.

In FIG. 3, the distance is shown as the perpendicular of guide rail section 2b to a point on guide rail section 2a directly upstream of the beginning of deflection region 6. Distance $b_1$ increases to distance $b_2$, where the curved, radius-shaped, presently concavely curved section 11 in this embodiment is provided downstream of deflection region 6. The radius of curvature is, for example, in a range from 400 mm to 1000 mm. For example, a straight guide rail section can further be provided between curved section 11 and deflection region 6, for example, parallel to the guide rail at the front side. This is where section 11 directly adjoins deflection region 6. Width $b_1$ is, for example, in a range from 50 mm to 100 mm, e.g. 60 mm. The distance between the oppositely disposed guide rail sections widens to a region $b_2$ of 300 mm to 600 mm or 350 mm to 450 mm.

Despite the increase in working height at the front side of suspension unit 1, there is a very large working area following the widening section 11 that is presently curved, for example, having a length of 500 mm to 700 mm at a total length 1 of guide rail 2 of 2000 mm to 4500 mm. The working area on the front side is in the range from 70%-90%.

Figure 4A:
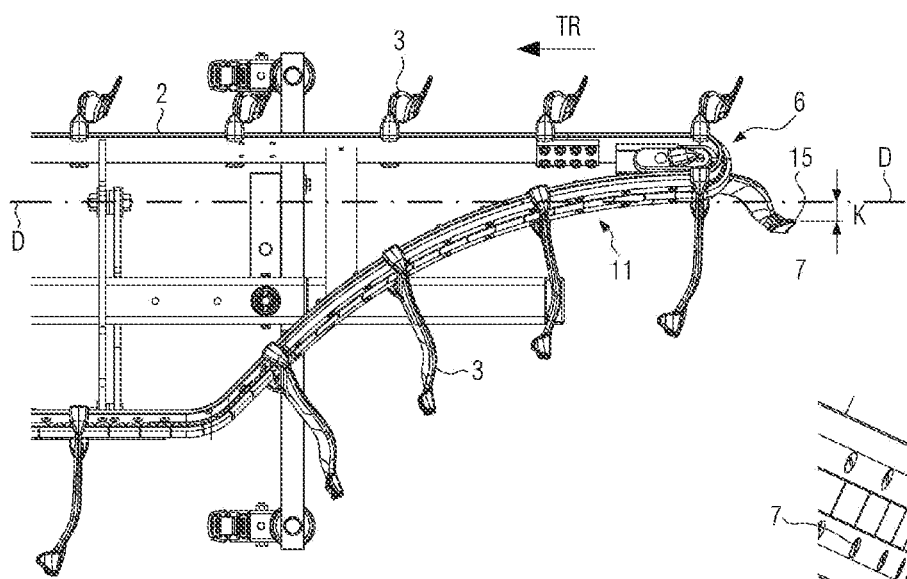
FIG. 4A shows an enlarged detail of a region of the suspension unit shown in FIG. 3 that comprises the deflection region.
Figure 4B:
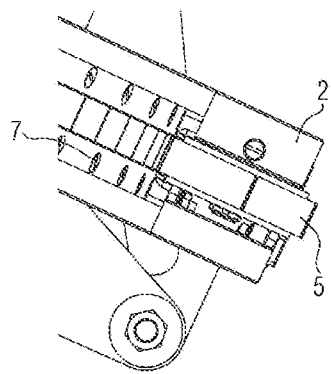
FIG. 4B shows portion of the deflection region shown in FIG. 4A in the direction of transport.

If a curved section 11 is used, as shown in FIG. 3, then it is possible, as is apparent from FIGS. 4A and 4B, to provide at least one retaining element, presently retaining strips 7, which hold revolving drive element 5 on guide rail 2, because otherwise the revolving drive element would protrude from the guide rail in a string-like manner e.g. during changeover of the hooks or with large group spacing. The two retaining strips 7 in FIG. 4B may be L-shaped and engage in recesses (for example, at the top and the bottom) of the drive element, and thus retain drive element 5. At the same time, retaining strips 7 are fastened to guide rail 2. The drive element can slide past the retaining strip.

Figure 5:
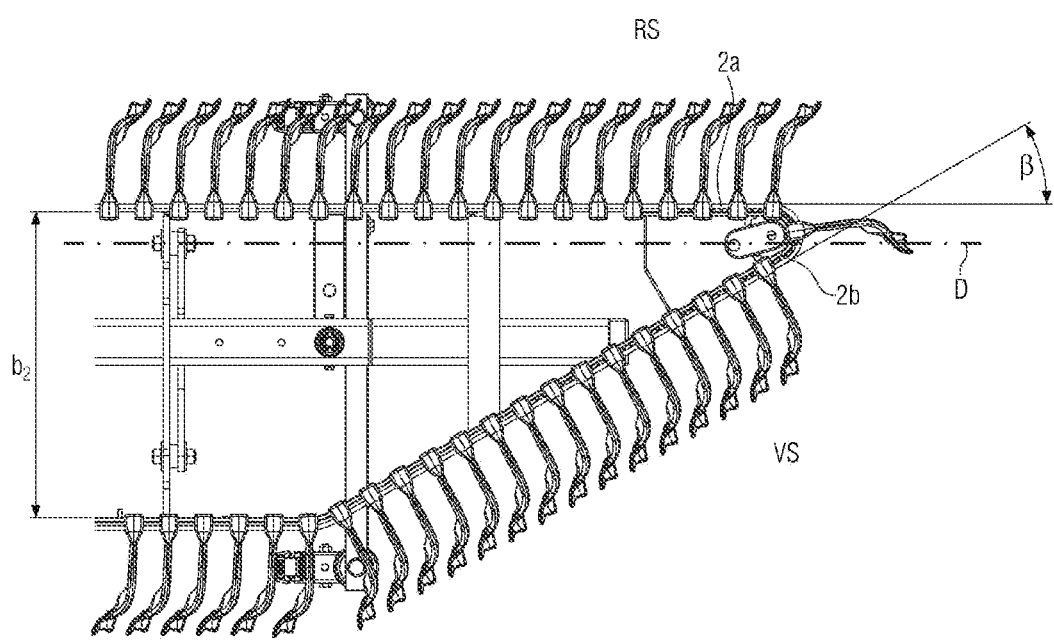
FIG. 5 shows a rough schematic alternative to the deflection region shown in FIG. 4.

It is also possible that the hooks are deflected in deflection region 6 by an angle <180°, for example 95-180° or 160-180°, as shown in FIG. 5. A guide rail section 2a on the rear side and a guide rail section 2b on the front side can then be arranged such that the sections converge toward deflection region 6 at an acute angle β, where angle β is in a range from 5-85°, or 15 and 45°, and inclined section 2b is selected to be long enough that the desired width $b_2$ is obtained.

FIGS. 1-7 show the respective axis of rotation D. As can be seen from the figures, the axis of rotation may extend closer to the rear side RS of guide rail 2. The axis of rotation may extend parallel to the longitudinal axis of suspension unit 1, i.e. parallel to the direction of transport TR, which in turn corresponds to the filling direction of the stuffing machine or the direction of transport of the linking line, respectively. Axis of rotation D may be located in a plane that is spanned by a vector which extends substantially parallel to direction of transport TR and a vector which is perpendicular to the upper side or the surface of the closed guide rail, such as in the deflection region. When for example α=0, this surface is a horizontal surface, is otherwise a surface that is, for example, inclined by angle α relative to the horizontal surface. When axis of rotation D is arranged closer to the rear side of guide rail 2 than to the front side, the relative motion of guide rail 2 at the rear side is less than the relative motion of the guide rail at the front side. This may be advantageous since deflection region 6 begins from the rear side of the guide rail and has a relatively narrow size, so that this region remains relatively stationary during pivoting, which may be advantageous for the reliable transfer of the sausage loops. The axis of rotation is located above chassis 4 and the distance of the axis of rotation from a virtual area or plane which is spanned by the lower edges of the guide rail may be 10 mm-150 mm.

When in a transfer position in the deflection region as shown for example in FIGS. 3, 4 and 5, it may be advantageous for hook tip 15 to have the smallest possible distance from the axis of rotation, such as a distance k<=approx. 50 mm, as indicated, for example, in FIG. 4A. The perpendicular of the tip to the axis of rotation is there defined as the distance. This provides that the tip of the hook is as stationary as possible, with a change in the pivot angle α, and reliable operation.

Figure 6:
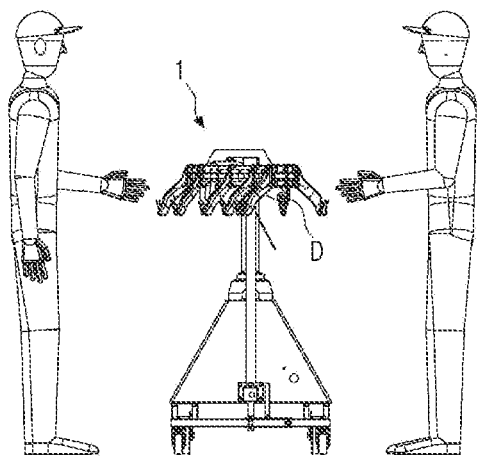
FIG. 6 shows a suspension unit with a horizontally pivoted guide rail.
Figure 7:
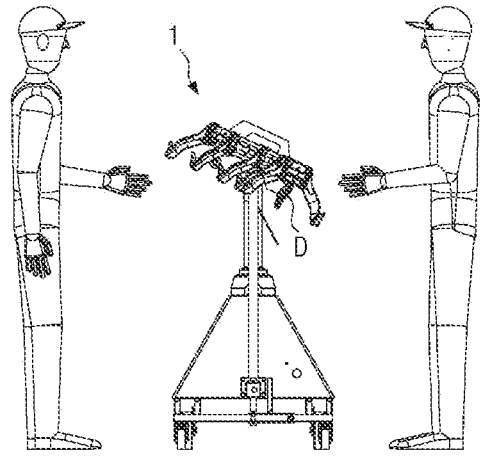
FIG. 7 shows the guide rail shown in FIG. 6 with the position inclined.
Figure 8:
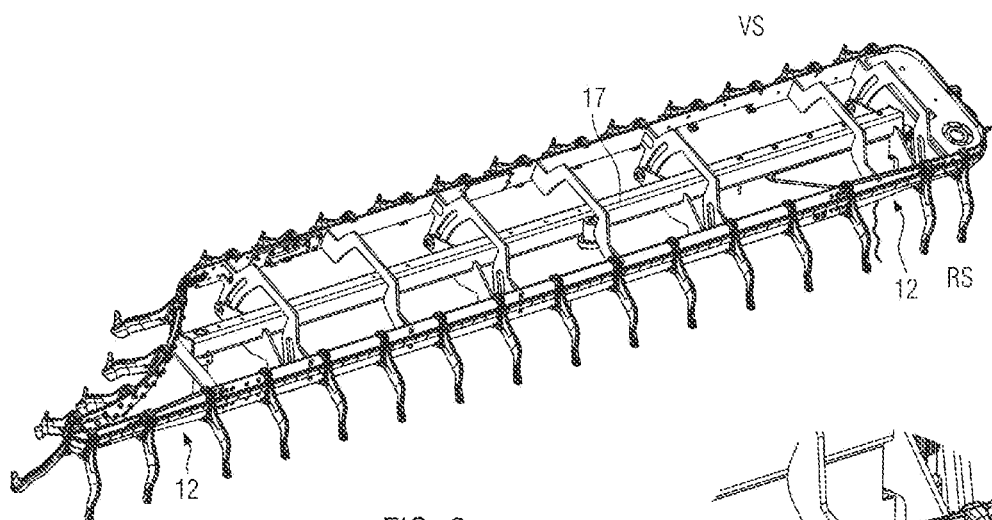
FIG. 8 shows a further embodiment of the guide rail with a twisted guide rail section.
Figure 9:
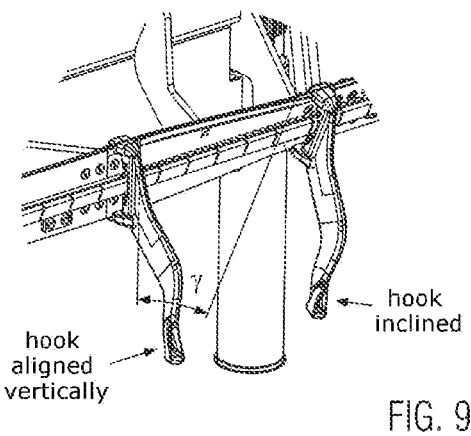
FIG. 9 shows an enlarged region of the twisted guide rail section of FIG. 8.

As is evident from FIGS. 6 and 7, the guide rail can therefore be pivoted together with drive element 5 and hook 3 by the angle α and adapted to the individual height of an operator. The hook position is then also changed, i.e. pivoted with the guide rail. The hooks may be pivoted downwardly at the rear side so that they are no longer properly aligned vertically, for example, guide section 14 is no longer arranged vertically, but pivoted by angle α like the guide rail. If the hooks are not properly inclined, meaning that the separation points of the sausages are not located properly between arms 22 and 21, then the loops are not sufficiently spread and may be difficult to remove with the smoke stick. One possibility is to provide two or more twisted guide rail sections 12, as shown in FIGS. 8 and 9. For example, the guide rail is then twisted on the rear side. The guide rail may be twisted between the beginning and the end of the rear side by an angle of rotation +γ and −γ such that the inclination of the guide rail or the hook position, respectively, is fully or partially balanced. This means that the hooks are taken back to a position that corresponds to a hook position, at α=0±10°.

It is also possible to configure the hooks such that they are correctly aligned when guide rail 2 is pivoted in a certain angular range and adequately spread the sausages.

FIGS. 10-16 show an alternative manner of how the hooks are taken to a correct position at the rear side, such as to a vertical position of the guide section.

Figure 10:
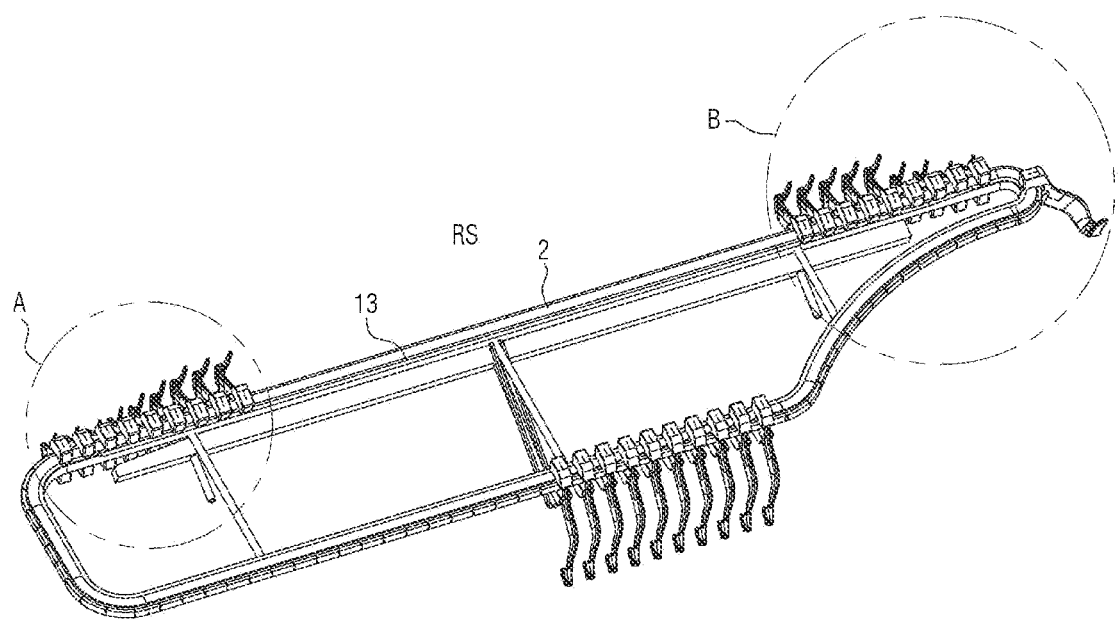
FIG. 10 shows a perspective view of a further embodiment in a perspective view with an additional guide for adjusting the hook.

FIG. 10 shows additional guide 13, which is presently arranged e.g. parallel to guide rail 2 in the region of the rear side. As is apparent from FIG. 11, rail 13 is located in a region arranged adjacent to guide region 14 of hook 3 on the inner side of the guide rail. If guide rail 2 is oriented, for example, horizontally, guide region 14 of the hook is then in a correct vertical position, and the arms of the hook are in a correct take-up position, respectively. If guide rail 2 is pivoted by an angle α, as is apparent from FIGS. 13 and 14, then additional guide 13 presses onto guide region 14 of hook 3 in such a manner that the hook mounted rotatably around a correspondingly formed guide rail 2 is pivoted upwardly, namely by an angle that corresponds substantially to α±10°.

Figure 13:
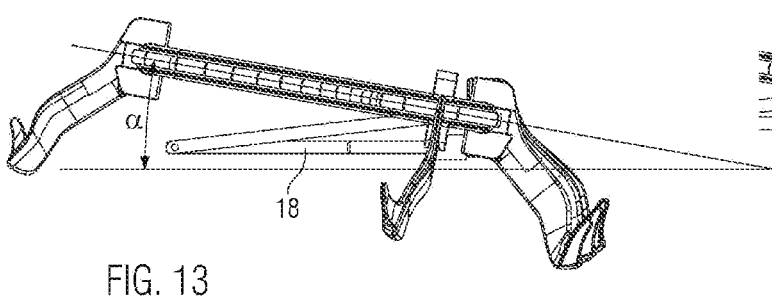
FIG. 13 is a view in the filling direction with an inclined guide rail of the embodiment shown in FIG. 10 at an angle α=10°.
Figure 14:
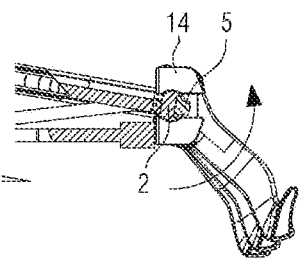
FIG. 14 shows a sectional view of the hook shown in FIG. 13.
Figure 15:
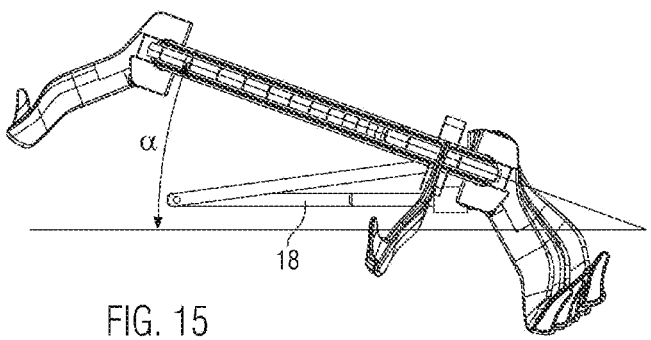
FIG. 15 corresponds to the embodiment shown in FIG. 13 with an angle α of 20°.
Figure 16:
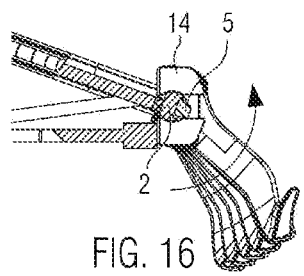
FIG. 16 is a sectional view of the hook shown in FIG. 15.

FIGS. 13 and 14 show a view at a pivot angle of 10°. FIGS. 15 and 16 show a view at a pivot angle of 20°. As can be seen when comparing the figures, there is a mechanical connection or coupling 18, respectively, between additional guide 13 and guide rail 2 such that the position of additional guide 13 is automatically adjusted whit the pivot motion of the guide rail. If guide rail 2 is pivoted by angle α in one direction or back again, respectively, then additional strip 13 moves toward the hook or in an opposite direction.

Figure 11:
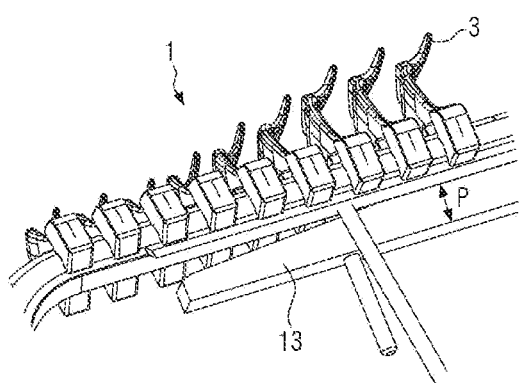
FIG. 11 is an enlargement of region A in FIG. 10.
Figure 12:
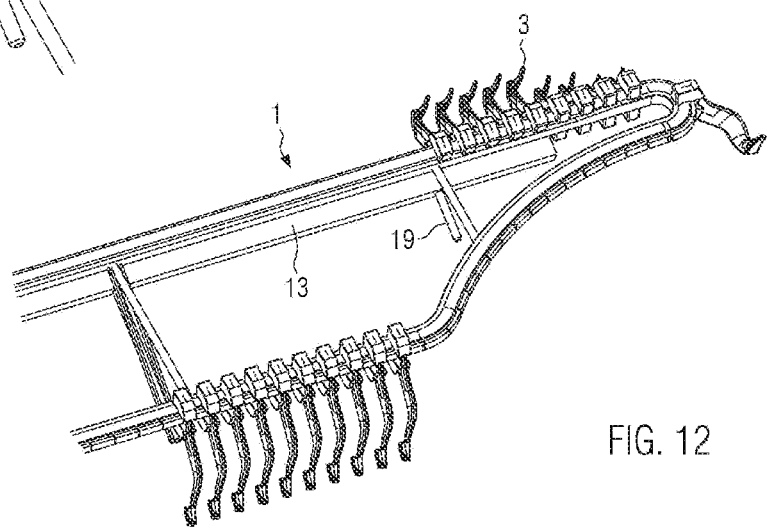
FIG. 12 is an enlargement of region B in FIG. 10.

As can be seen from FIGS. 10 and 11, the hooks in a corresponding embodiment can move along additional guide 13 or additional strip 13, respectively. The width P of additional guide 13 increases continuously in the direction opposite to the direction of transport TR, so that the hooks are not abruptly rotated, but pivot upwardly gradually to a maximum position. In contrast to the preceding embodiments, guide rail 2 is there, for example, formed to be cylindrical so that guide region 14 of the hooks can be rotatably mounted. Drive element 5 also runs between guide rail 2 and hooks 3. As shown in FIGS. 10-12, the hooks can then run in an upwardly pivoted position on the rear side RS of guide rail 2 and at the end of guide rail 2 on the rear side RS be pivoted down again, since additional guide 13 terminates there. It is there not necessary that the width P of the additional guide gradually decreases because the sausage loops have already been removed in this region. Although automatic adjustment of the hook position by way of the mechanical coupling may be advantageous, it is also possible, however, that the additional guide is adjusted and locked accordingly by the operator, for example, by way of a bolt 19.

Figure 20:
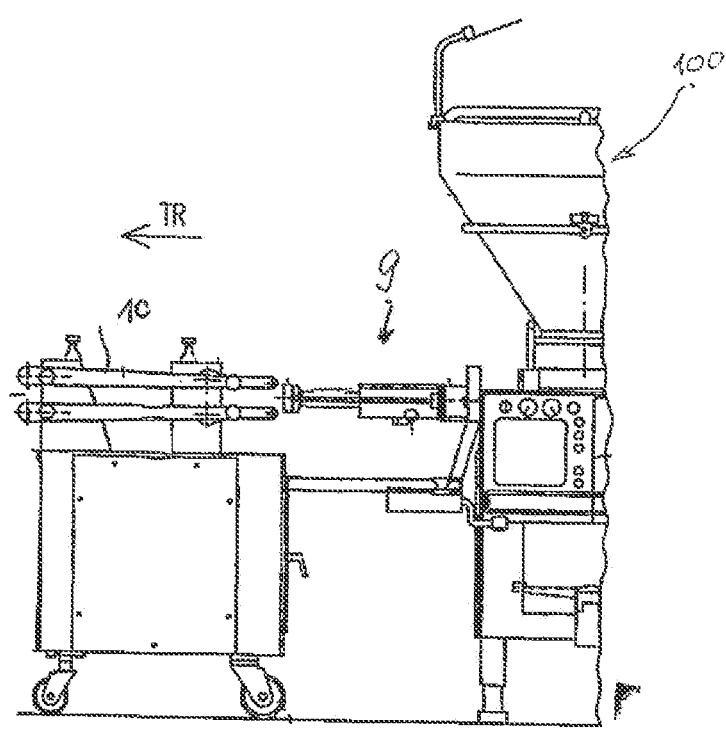
FIG. 20 shows a sausage stuffing machine.

FIG. 20 shows a stuffing machine and a linking line 9, which is also shown in FIG. 1. The linking line 9, which is upstream of the suspension unit, is connected to the stuffing machine and can divide the sausage casing stuffed with pasty mass. The suspension unit is provided in direction TR after the transport belts 10, as can be seen in FIG. 1. As mentioned previously, the axis of rotation may run substantially parallel to the direction of transport TR, which in turn corresponds to the filling direction of the stuffing machine and the direction of transport of the belts 10 of the linking line 9.

FIGS. 1-20 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The terms approximately or substantially are defined as a tolerance of 10% greater or less than the stated value or range of values unless otherwise indicated.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. The term approximately is construed to mean plus or minus five percent of the stated values unless otherwise specified. Such claims, whether broader, narrower, equal, or different in scope to the original claims, also are regarded as included within the subject matter of the present disclosure.

The invention claimed is:

1. A suspension unit for receiving and transporting sausage loops with hooks rotating around a guide rail, the guide rail having an elongated front side and an opposite rear side, wherein
the guide rail is inclined to a horizontal plane in such a way that the front side is at a higher level than the rear side.

2. The suspension unit according to claim 1, wherein a drive element is arranged on the guide rail and is inclined together with the guide rail.

3. The suspension unit according to claim 2, wherein the drive element is a drive belt.

4. The suspension unit according to claim 1, wherein a height level of the front side of the guide rail is adjustable continuously or at discrete intervals.

5. The suspension unit according to claim 1, wherein the guide rail has, at a first end, a deflection region in which the hooks are deflected from 95°-180°, the hooks in the deflection region receiving dividing points of sausage chains.

6. The suspension unit according to claim 1, wherein a distance of a guide rail section on the front side immediately before the deflection region from a guide rail section on the rear side immediately after the deflection region is smaller than a distance $b_2$ in a region following the transport direction.

7. The suspension unit according to claim 6, wherein the guide rail and/or at least respective guide rail sections run towards the deflection region on the front side and the rear side at an acute angle of between 5°-85° in such a way that the distance $b_1$ widens to the distance $b_2$, and
a guide rail section running obliquely to the transport direction is arranged on the front side after the deflection region.

8. The suspension unit according to claim 7, wherein the acute angle is between 15° and 45°.

9. The suspension unit according to at least claim 6, wherein a concavely curved guide rail section is arranged after the deflection region (6) on the front side, such that the distance b1 widens to the distance b2.

10. The suspension unit according to claim 9, wherein retaining elements hold the drive element on the guide rail.

11. The suspension unit according to claim 10, wherein the retaining elements are retaining strips.

12. The suspension unit according to claim 6, wherein the distance $b_1$ is in a range of 50 mm-100 mm and the distance $b_2$ increases in a following range up to 300 mm-600 mm.

13. The suspension unit according to claim 1, wherein the device comprises an additional guide.

14. The suspension unit according to claim 13, wherein the hooks are rotatably mounted on the guide rail.

15. The suspension unit according to claim 1, wherein the device has an additional guide and wherein the guide track is mechanically coupled to the additional guide.

16. The suspension unit according to claim 1, wherein the guide rail is twisted at least in sections by an angle $\gamma=\alpha\pm10°$.

17. A method for suspending sausage loops on a suspension unit with hooks rotating around a guide rail, the guide rail having an elongated front side and an opposite rear side, wherein the guide rail is inclined to a horizontal plane in such a way that the front side is at a higher level than the rear side, wherein compartment points of sausage chains are taken over by the hooks in a deflection region of the suspension unit, then after the deflection region are moved simultaneously in a transport direction, upwards and transversely to the transport direction.

18. The method according to claim 17, wherein on the front side of the guide rail product processing and/or removal of the sausage loops with a smoke stick takes place and on the rear side removal of the sausage loops with a smoke stick takes place.

19. A filling machine with a calibration line and a suspension unit, the suspension unit for receiving and transporting sausage loops with hooks rotating around a guide rail, the guide rail having an elongated front side and an opposite rear side, wherein the guide rail is inclined to a horizontal plane in such a way that the front side is at a higher level than the rear side.

* * * * *